April 14, 1970   H. J. CHAMPAGNE   3,506,205
SPREADER FOR CONVEYOR
Filed Aug. 24, 1967   3 Sheets-Sheet 1

INVENTOR
*Harry J. Champagne*

BY

ATTORNEY

April 14, 1970

H. J. CHAMPAGNE 3,506,205

SPREADER FOR CONVEYOR

Filed Aug. 24, 1967

INVENTOR
*Harry J. Champagne*

BY

ATTORNEY

April 14, 1970 H. J. CHAMPAGNE 3,506,205
SPREADER FOR CONVEYOR
Filed Aug. 24, 1967 3 Sheets-Sheet 3

INVENTOR
Harry J. Champagne
BY
ATTORNEY

United States Patent Office 3,506,205
Patented Apr. 14, 1970

3,506,205
SPREADER FOR CONVEYOR
Harry J. Champagne, P.O. Box 1827,
Mobile, Ala. 36601
Filed Aug. 24, 1967, Ser. No. 663,151
Int. Cl. B02c; B65g
U.S. Cl. 241—283                                                9 Claims

ABSTRACT OF THE DISCLOSURE

This application discloses apparatus for spreading materials on a conveyor such as would be used in a refuse processing plant. The spreader comprises a reciprocating ram assembly positioned above the conveyor and may include a push bar on the front face of the ram and a roller on the bottom edge of the ram. The ram assembly is located in a walled section, with guides on the walls defining the path of reciprocating motion of the assembly. Movement of the ram may be provided by a hydraulic arrangement.

---

The spreader mechanism according to this invention has particular utility in refuse processing plants as may be operated by a city for the purpose of processing materials collected in garbage trucks from waste containers in residential and industrial areas. Ordinarily, these trucks contain a compacting mechanism, usually hydraulic, which compacts the waste materials so that the trucks may haul a greater volume. In handling the material brought into the processing plant by the trucks, it is usually necessary to provide a sorting operation in that large pieces of metal and glass are preferably removed from the remainder which would be primarily organic material, this being subsequently composed to produce a fertilizer-like substance. The sorting may be done manually while the material moves along a conveyor, but in such case it is necessary that the material be spread evenly along the conveyor, that the material be fairly loosely arranged, and that the depth of material traveling along the conveyor be fairly thin. When truck loads of compacted waste material are dumped onto a conveyor, however, it is seen that there would be large mass of closely packed material intermittently spaced along the conveyor which would make the sorting operation entirely unsatisfactory. It has been a prior practice, of course, to spread materials in a mechanism such as this by merely positioning a scraper or the like above the conveyor at the proper height. This would be unsuitable in the present environment because of large compacted truck loads which would cause pile up of material behind the scraper.

It is therefore the principal object of this invention to provide apparatus for use in combination with a conveyor or the like for the purpose of spreading material fairly evenly along the conveyor, particularly when the material is deposited upon the conveyor in large compacted forms. It is a further object to provide such a spreader mechanism for a conveyor which is suitable for use in a waste material processing plant for the purpose of spreading material between the point where refuse trucks dump the material onto the conveyor and a point where manual sorting operations are performed.

In accordance with a preferred embodiment of the invention, spreader apparatus is provided in the form of a ram assembly which is positioned above a moving conveyor and which is connected to a drive mechanism to produce reciprocating motion along a path parallel to the direction of travel of the conveyor. The reciprocating motion of this ram assembly is effective in breaking up large masses of material and spreading it evenly along the conveyor, and also for preventing pile up of material behind the spreader mechanism. To aid in these functions it is preferable that a push bar be mounted on the front face of the ram assembly extending outwardly therefrom, and also that rollers be mounted on the bottom edge of the ram assembly to aid in permitting the ram assembly to traverse the material on the conveyor. The ram assembly may be driven by hydraulic cylinders mounted in the back of the ram and controlled by a feedback arrangement responsive to the position of the ram. Vertical walls are preferably provided in the area adjacent the ram assembly to prevent spillage of material over the sides of the conveyor and also to provide support for guide channels which define the path of movement of the ram assembly.

The novel features believed characteristic of the invention are set forth in the appended claims. The invention itself, however, as well as further objects and advantages thereof, will best be understood by reference to the following detailed description of a particular embodiment, when read in conjunction with the accompanying drawings, wherein:

Figure 1:
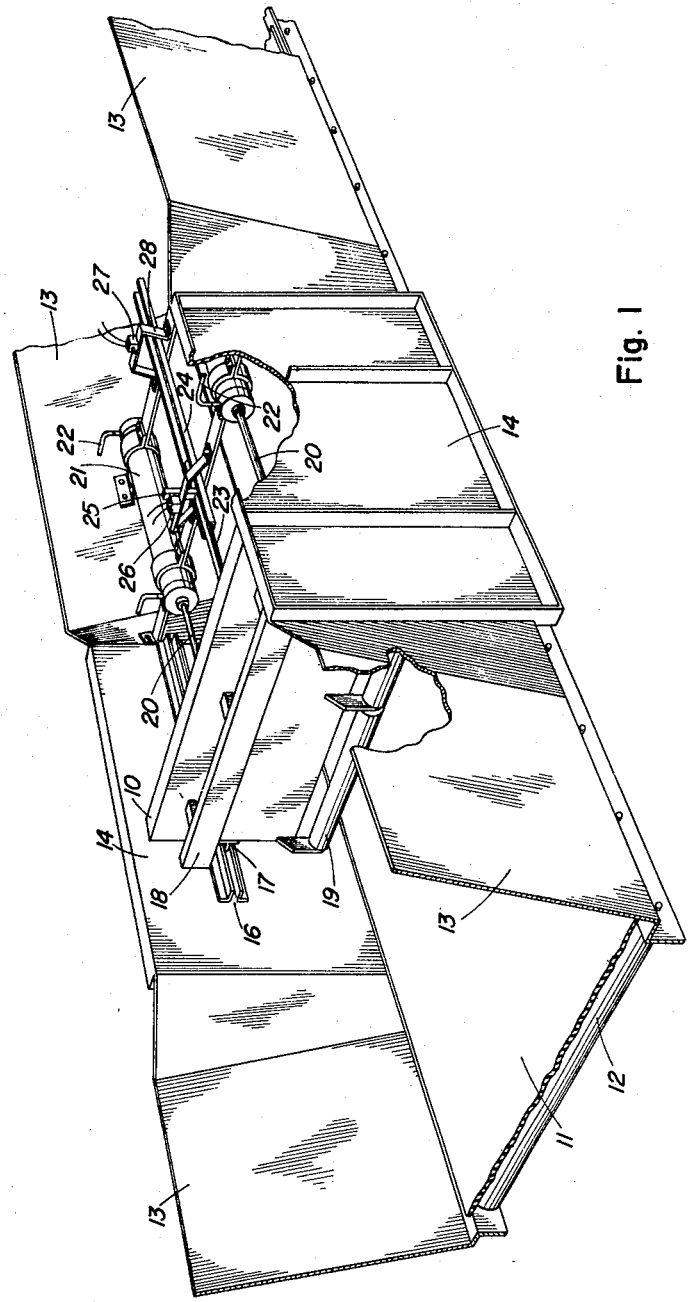
FIGURE 1 is a pictorial view, partly broken away, of spreading apparatus for a conveyor in accordance with this invention.

With reference now in particular to FIGURE 1 of the drawings, the apparatus of this invention basically comprises a ram member 10 which is adapted for reciprocating movement above a conveyor 11. The conveyor would ordinarily be an endless belt which is driven to the right in the view of FIGURES 1-3 by means now shown. The belt is supported by and moves along roller 12. Sidewalls or shields 13 of sheet metal, supported by means not shown, are provided on each side of the conveyor 11 for the purpose of preventing spillage. These sidewalls are slanted outward or flared to facilitate dumping of truck loads of material into the conveyor. It is noted that adjacent the ram 10 the sidewalls are brought inward to a vertical position at walls 14 to provide a firm support for the guides for the ram assembly.

Figure 2:
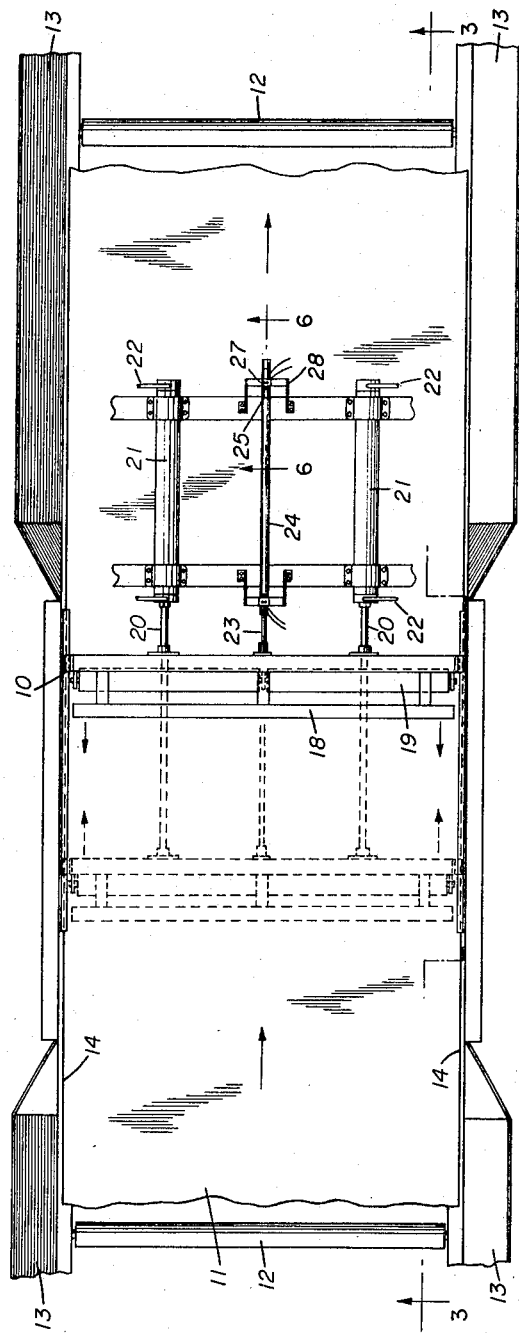
FIGURE 2 is a plan view of the apparatus of FIGURE 1.
Figure 3:
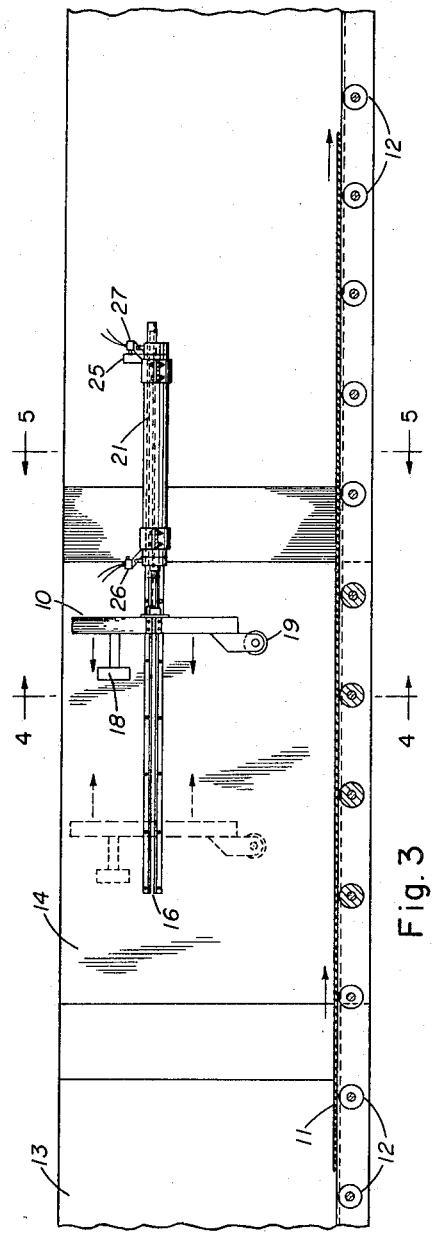
FIGURE 3 is an elevation view in section of the apparatus of FIGURE 2, taken along the line 3—3 in FIGURE 2.
Figure 4:
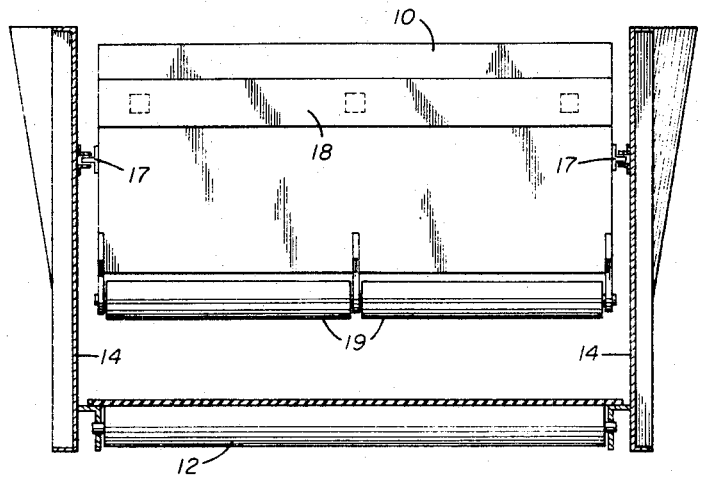
FIGURE 4 is an elevation view in section of the apparatus of FIGURES 1-3, taken along the line 4—4 in FIGURE 3.
Figure 5:
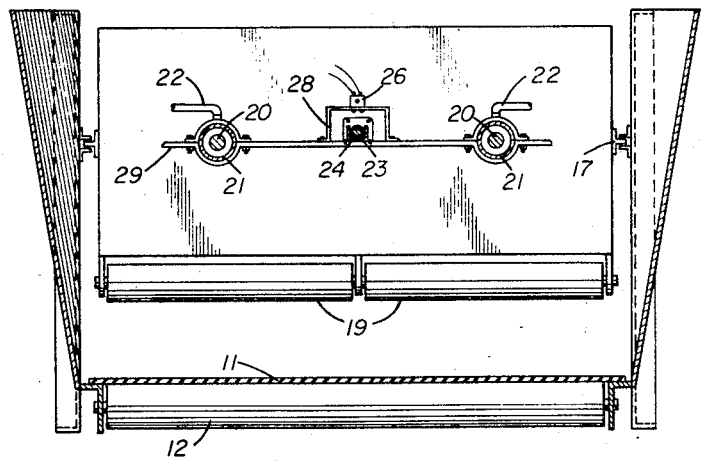
FIGURE 5 is an elevation view in section of the apparatus of FIGURES 1-3, taken along the line 5—5 in FIGURE 3.
Figure 6:
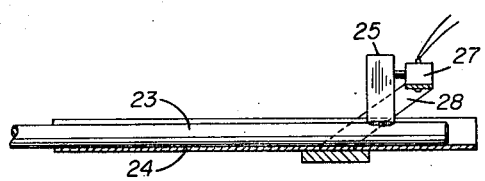
FIGURE 6 is a detailed view in section of the limit switch device used with this invention, taken along the line 6—6 in FIGURE 2.

In operation of the apparatus of FIGURES 1-3 for its intended purpose, the mechanism is utilized as a part of a conveyor system in a refuse or garbage processing plant wherein truck loads of compacted garbage are dumped onto the conveyor 11 at the left-hand end in the views of FIGURE 1-3 and moved along by the conveyor toward the right where sorting and composting operations are performed. Ordinarily, the garbage is collected in trucks which contain hydraulically operated compacting mechanisms so that the material when dumped into the conveyor system is not loose but instead is in large compacted masses of perhaps five feet or more in dimensions. Prior to entering the sorting and composting operations, it is necessary that the material be spread evenly across the conveyor to a thickness of perhaps one or two feet. It is for the purpose of breaking up the large compacted masses and spreading the material across the conveyor that the ram mechanism 10 is utilized. It is noted that the use of merely a stationary member extending across the conveyor spaced one or two feet from the top would be ineffective since the compacted material would pile up behind the member. However the mechanism according to this invention is quite effective in breaking up and spreading the material without causing jamming or piling up.

The ram mechanism 10 comprises a large flat plate 15 which extends all the way across the width of the conveyor, spaced about two feet from the top surface of the conveyor 11. The member 15 is mounted for reciprocating motion along the walls 14 by means of tracks 16 mounted on the walls along with protuberances 17 positioned on each side of the member 15 to ride in the grooves. Mounted on the front face of the member 15 is a push bar 18 which aids in moving and breaking up the compacted material and in positioning it so that the ram member 10 may pass over it. The push bar 18 also aids in preventing the pile up of material in front of the ram mechanism. Mounted on the lower edge of the ram mechanism 10 are rollers 19 which are free to rotate about their axis. These rollers 19 aid in permitting the ram mechanism to move back and forth in a reciprocating motion over the top of the material on the conveyor. The rollers are mounted on the lower edge of the back plate 15 by suitable brackets. The combination of the push bar 18 and rollers 19, along with the reciprocating motion as will be described, is particularly effective in breaking up and spreading the material while avoiding the pile up of the large compacted masses of material in front of the ram mechanism.

The ram mechanism 10 is driven back and forth in a reciprocating movement parallel to the conveyor 11 by a hydraulic mechanism, although it is of course understood that other drive mechanism may be constructed. Connected to the back face of the ram mechanism are a pair of rods 20 which extend into a pair of hydraulic cylinders 21 and of course terminate at pistons within the hydraulic cylinders. The pistons, and thus the rods 20, are driven back and forth through the cylinders 21 by hydraulic fluid pumped alternately into one end or the other of the cylinders through lines 22, these lines being connected to suitable pumps or valves in a hydraulic control arrangement. To control the pumping of hydraulic fluid into the cylinders 21, a control rod 23 is also mounted on the back of the ram mechanism 10 and rides in a guide channel 24. A protuberance 25 on the control rod 23 is positioned to engage each of a pair of limit switches 26 and 27. The limit switches are electrical switches which when actuated cause the hydraulic control valves or pumps to reverse the flow of hydraulic fluid into the cylinders 21. Thus, when the ram mechanism 10 reaches the rearmost limit of travel as seen in solid lines in FIGURES 2 and 3 the protuberance 25 comes into contact with the operating arm of the limit switch 27. Closing of the contacts in the switch 27 will cause the hydraulic control mechanism to operate in a manner such that the flow of pressurized hydraulic fluid into the cylinders 21 will reverse and high pressure fluid will be pumped into the lines 22 at the right-hand ends of the cylinders while the lines 22 at the left-hand ends of the cylinders 21 will function as return lines. The ram mechanism will thus be driven to the left as seen in FIGURES 2 and 3 until it reaches the left-hand limit of travel as shown in dotted lines in these figures. At this time, the protuberance 25 will engage the limit switch 26 causing the cycle to reverse and high pressure fluid to be pumped into the left-hand ends of the cylinders thus driving the ram mechanism 10 back to the right.

It will be noted that this hydraulic drive mechanism provides feedback control wherein the position of the ram assembly 10 is used in controlling the supply of pressurized fluid to the hydraulic cylinders 21. Thus, the stroke of the ram assembly 10 will always be the same, which would be typically about six feet, and any tendency of the ram assembly to stall when confronted with an unusually large mass of material will merely result in pressurized fluid being supplied to the cylinders 21 until the ram assembly reaches the front or back limit.

The limit switches 26 and 27 are supported by struts 28 which in turn are mounted on suitable support members 29 which may also support the hydraulic cylinders, although of course the particular structure used to mount these various elements is not critical to the invention. The limit switches are preferably mounted so that the protuberance 25 on the control rod 23 may move on past the limit switches in case the inertia of the ram assembly or the delay in actuation of the hydraulic control causes the movement of the ram assembly to be not immediately reversed.

It will thus be seen that the spreading apparatus according to the invention provides an effective yet fairly simple and easily constructed mechanism for distributing the compacted material along the conveyor.

While the invention has been described with reference to a particular embodiment, it is of course understood that this description is not to be construed in a limiting sense. Various modifications of the disclosed embodiment, as well as other embodiments of the invention, will be apparent to persons skilled in the art upon reference to this specification. It is therefore contemplated that the appended claims will cover any such modifications or embodiments as fall within the true scope of the invention.

What is claimed is:

1. Apparatus for spreading material on a moving conveyor comprising a ram member positioned above said conveyor for reciprocating movement along a path generally parallel to the direction of motion of the conveyor, and means for driving the ram member along said path said conveyor being a belt moving in a generally straight path and wherein the ram member is positioned for movement within a walled area above the conveyor.

2. Apparatus according to claim 1 wherein the ram member includes a bar supported on a face thereof spaced away from such face in a direction facing movement of the conveyor.

3. Apparatus according to claim 1 wherein the ram member includes roller means positioned at the lower edge thereof to bear upon the material being spread.

4. Apparatus according to claim 1 wherein the means for driving the ram member includes at least one hydraulic cylinder and piston arrangement with coupling means connected to the ram member.

5. Apparatus according to claim 4 wherein an elongated member coupled to the ram member at the rearward side thereof adjacent the hydraulic cylinder and piston arrangement controls the pumping of hydraulic fluid thereto by means of control means actuated by the elongated member.

6. Apparatus for spreading material on a moving conveyor comprising a ram member positioned above said conveyor for reciprocating movement along a path generally parallel to the direction of motion of the conveyor and means for driving the ram member along said path, said ram member including a generally flat member positioned normal to the plane of the conveyor extending across the width of the conveyor.

7. Apparatus according to claim 6 wherein the ram member further includes a push bar supported on the side of the ram member which faces the direction of movement of the belt, the push bar being spaced from such face, and includes roller means positioned at the lower edge of the ram member to bear upon the material being spread.

8. Apparatus according to claim 7 wherein the conveyor is a belt moving in a generally straight path and wherein the ram member is positioned for movement within a walled area above the conveyor.

9. Apparatus according to claim 8 wherein the means for driving the ram member includes at least one hydraulic cylinder and piston arrangement with coupling means connected to the ram member and means for controlling the hydraulic arrangement in response to the position of the ram member.

References Cited

UNITED STATES PATENTS 868,617  10/1907  Scozzari _____ 241—283 X

EDWARD A. SROKA, Primary Examiner